F. H. FORD.
DYNAMO ELECTRIC MACHINE.
APPLICATION FILED JULY 3, 1913.
1,085,116.
Patented Jan. 27, 1914.
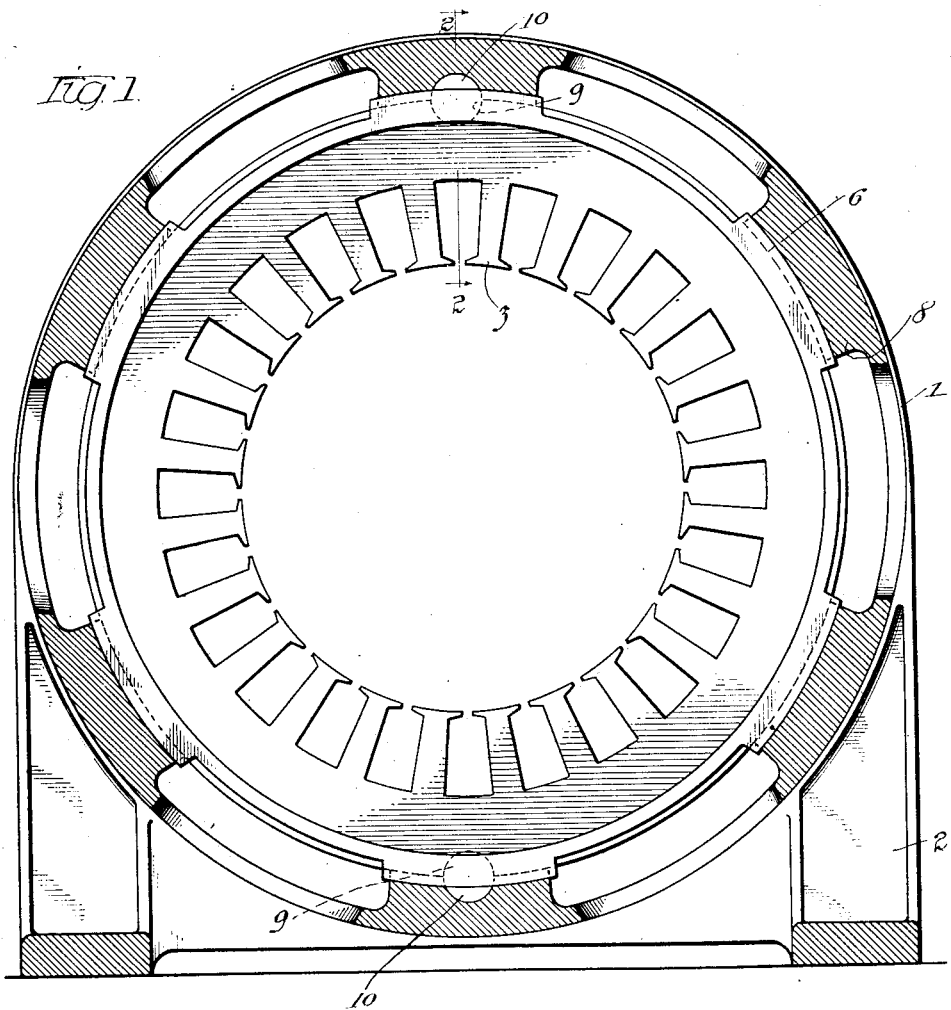
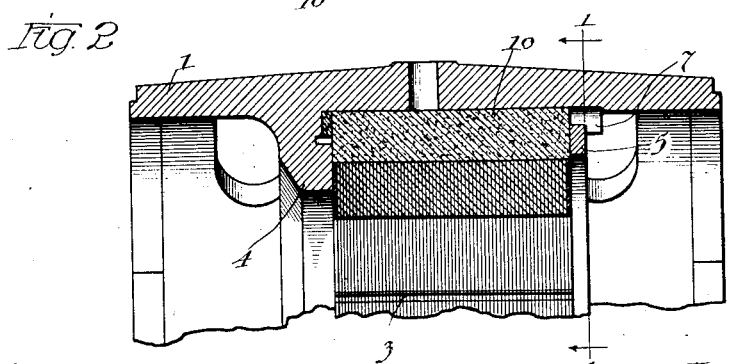
Witnesses:
Inventor
Frederick H. Ford,

UNITED STATES PATENT OFFICE.

FREDERICK H. FORD, OF MILWAUKEE, WISCONSIN, ASSIGNOR TO THE MECHANICAL APPLIANCE COMPANY, OF MILWAUKEE, WISCONSIN, A CORPORATION OF WISCONSIN.

DYNAMO-ELECTRIC MACHINE.

1,085,116.
Specification of Letters Patent.
Patented Jan. 27, 1914.

Application filed July 3, 1913. Serial No. 777,313.

*To all whom it may concern:*

Be it known that I, FREDERICK H. FORD, a citizen of the United States, residing at Milwaukee, in the county of Milwaukee and State of Wisconsin, have invented new and useful Improvements in Dynamo-Electric Machines, of which the following is a full, clear, concise, and exact description, reference being had to the accompanying drawing, forming a part of this specification.

My invention relates to improvements in dynamo electric machines, and particularly that type for use in connection with alternating currents.

One of the objects of my invention is to provide means whereby the cost of construction and assemblage, particularly of the field member of the machine, may be reduced to a minimum and at the same time the strength and efficiency of the machine increased.

For the purpose of disclosing my invention, I have illustrated one embodiment thereof in the accompanying drawing, in which—

Figure 1 is a sectional view of the field member of a machine embodying my invention, taken on the line 1—1 of Fig. 2; Fig. 2 is a detail sectional view taken on the line 2—2 of Fig. 1.

In the embodiment of the machine illustrated in the accompanying drawing, I provide a main cast metal frame 1, having a suitable base 2, and having a cylindrical internal conformation in which is mounted a laminated core 3, suitably slotted to form pole pieces for the winding. This core 3 is clamped in position in the frame between an annular ring or stop member 4, integrally formed with the frame, and a locking ring 5, which is removably mounted in the frame and is provided with a plurality of segmental projections 6, adapted to engage behind a plurality of segmental shoulders 7 formed on the internal circumference of the frame 1. These shoulders 7 are preferably formed on transversely extending cast lugs 8 of the frame.

To prevent the laminated core from turning in the frame, at the top and bottom of the core I cut a semi-circular groove, 9, which is adapted to coincide with a semi-circular groove 10 formed in the frame. The circular groove thus formed by the coinciding semi-circular grooves 9 in the laminated core and the semi-circular groove 10 in the frame is filled with Babbitt or other suitable metal which forms a continuous core or locking member to prevent the relative movement between the laminated core and the frame.

In assembling, the laminated core is inserted in position, suitable fiber disks being arranged on each side thereof. The locking ring is then placed in position with the segmental projections 6 arranged in the spaces between the lugs 8. The ring is given a turn so as to bring the segmental section 6 thereof behind the segmental shoulder 7 on the frame, whereby the laminated core is securely locked in position against lateral movement; Babbitt, or other suitable metal, is then poured into the groove formed by grooves 9 and 10. This securely locks the laminations in position against rotative movement. The rotor of the machine and other parts are then assembled in the usual manner.

Having thus described my invention, what I claim as new and desire to secure by Letters Patent, is:—

1. In a dynamo electric machine, the combination with a frame having an internal cylindrical conformation, of a laminated core arranged to be secured therein, an annular ring in said frame against which said core abuts, a plurality of segmental shoulders formed on said frame, and a locking ring for holding said core in position within said frame, having a plurality of segmental projections adapted to engage behind said segmental shoulders.

2. In a dynamo electric machine, the combination with a main frame having an internal cylindrical conformation, of a laminated core arranged to fit within said frame, an annular ring in said frame against which said core abuts, a plurality of segmental shoulders on said frame, a removable locking ring for holding said core within said frame, provided with a plurality of segmental projections adapted to engage behind said segmental shoulders, said frame having a plurality of grooves, said core having a plurality of grooves coinciding with the grooves in said frame, and a Babbitt or other suitable metal filling for the groove thus formed for locking the core against rotative movement in the frame.

In witness whereof, I have hereunto subscribed my name in the presence of two witnesses.

FREDERICK H. FORD.

Witnesses:
R. G. KELLOGG,
E. EVENSON.